US008775017B2

(12) United States Patent
Brusarosco et al.

(10) Patent No.: US 8,775,017 B2
(45) Date of Patent: Jul. 8, 2014

(54) METHOD AND SYSTEM FOR WEAR CONTROL OF VEHICLE TYRES (75) Inventors: Massimo Brusarosco, Milan (IT); Federico Mancosu, Milan (IT)

(73) Assignee: Pirelli Tyre, S.p.A., Milan (IT)

(*) Notice: Subject to any disclaimer, the term of this patent is extended or adjusted under 35 U.S.C. 154(b) by 533 days.

(21) Appl. No.: 13/125,552

(22) PCT Filed: Oct. 22, 2009

(86) PCT No.: PCT/IB2009/054674
§ 371 (c)(1),
(2), (4) Date: Apr. 21, 2011

(87) PCT Pub. No.: WO2010/046872
PCT Pub. Date: Apr. 29, 2010

(65) Prior Publication Data
US 2011/0202228 A1    Aug. 18, 2011

Related U.S. Application Data (60) Provisional application No. 61/202,062, filed on Jan. 26, 2009.

(30) Foreign Application Priority Data

Oct. 24, 2008  (IT) .............................. MI2008A1887

(51) Int. Cl.
| G01M 17/00 | (2006.01) |
| G01B 3/44 | (2006.01) |
| G01S 7/00 | (2006.01) |
| G01C 9/00 | (2006.01) |
| B60Q 1/00 | (2006.01) |
| B60C 23/00 | (2006.01) |
| B60C 11/24 | (2006.01) |

(52) U.S. Cl.
USPC ....... 701/33.7; 701/30.8; 701/30.9; 701/31.1; 701/31.4; 702/34; 702/41; 702/143; 702/150; 702/151; 340/438; 340/443; 340/445; 340/446; 340/447; 152/154.2; 152/209.1

(58) Field of Classification Search
USPC .............. 701/29.1–34.4; 702/33, 34, 41, 127, 702/150, 151; 340/438–447; 73/146–146.5; 152/151–154.2, 208–209.26
See application file for complete search history.

(56) References Cited

U.S. PATENT DOCUMENTS

| 5,864,056 A | 1/1999 | Bell et al. |
| 6,278,361 B1 | 8/2001 | Magiawala et al. |

(Continued)

FOREIGN PATENT DOCUMENTS

| EP | 1 106 397 A2 | 6/2001 |
| EP | 1 498 291 A1 | 1/2005 |

(Continued)

OTHER PUBLICATIONS

International Search Report from the European Patent Office for International Application No. PCT/IB2009/054674 (Mail date Mar. 12, 2010).

(Continued)

*Primary Examiner* — Muhammad Shafi
*Assistant Examiner* — Majdi Alsomiri
(74) *Attorney, Agent, or Firm* — Finnegan, Henderson, Farabow, Garrett & Dunner, L.L.P.

(57) ABSTRACT

A method for wear control of vehicle tires, includes: detecting deformation of an inner surface of a first tire by means of a first sensor; determining a first level of wear of the first tire; detecting a deformation of an inner surface of a second tire by means of a second sensor; determining a second level of wear of the second tire; comparing the first and second levels of wear with each other; and generating a notification signal representative of the comparison. Also disclosed is a system for wear control of vehicle tires, a method of determining the wear of a tire and a system for determining the wear of a tire.

43 Claims, 5 Drawing Sheets

(56) References Cited

U.S. PATENT DOCUMENTS

| | | | |
|---|---|---|---|
| 6,959,593 B2 * | 11/2005 | Mancosu et al. | 73/146 |
| 7,168,308 B2 * | 1/2007 | Mancosu et al. | 73/146 |
| 7,451,024 B2 * | 11/2008 | Brusarosco et al. | 701/33.7 |
| 2004/0064219 A1 | 4/2004 | Mancosu et al. | |
| 2005/0150284 A1 * | 7/2005 | Hernando et al. | 73/146.4 |
| 2005/0204806 A1 | 9/2005 | Brusarosco et al. | |
| 2005/0234613 A1 | 10/2005 | Brusarosco et al. | |
| 2007/0113635 A1 * | 5/2007 | Corniot | 73/146 |
| 2008/0015763 A1 | 1/2008 | Kitazaki et al. | |
| 2008/0027658 A1 | 1/2008 | Ichikawa et al. | |
| 2008/0103659 A1 | 5/2008 | Mancosu et al. | |
| 2009/0115590 A1 | 5/2009 | Brusarosco et al. | |

FOREIGN PATENT DOCUMENTS

| | | |
|---|---|---|
| EP | 1 759 891 A1 | 3/2007 |
| EP | 1 878 596 A2 | 1/2008 |
| JP | 2007-153034 | 6/2007 |
| WO | WO-03/082644 A1 | 10/2003 |
| WO | WO-2006/034731 A1 | 4/2006 |
| WO | WO-2008/065465 A1 | 6/2008 |
| WO | WO-2010/046871 A1 | 4/2010 |

OTHER PUBLICATIONS

Examination Report from the European Patent Office in the European Patent Application No. 09 774 730.7 mailed Sep. 11, 2013.

* cited by examiner

METHOD AND SYSTEM FOR WEAR CONTROL OF VEHICLE TYRES

CROSS REFERENCE TO RELATED APPLICATIONS

This application is a national phase application based on PCT/IB2009/054674, filed Oct. 22, 2009, which claims the priority of Italian Application Ser. No. MI2008A001887, filed Oct. 24, 2008, and the benefit of U.S. Provisional Application Ser. No. 61/202,062, filed Jan. 26, 2009, the content of all of which is incorporated herein by reference.

BACKGROUND OF THE INVENTION

1. Field of the Invention

The present invention relates to a method and a system for wear control of vehicle tyres.

The present invention also relates to a method and a system for determining the wear in a tyre.

2. Description of the Related Art

Tyres are subject to wear in use; it is therefore important to have the conditions of each tyre monitored, since the tyre performance varies depending on the wear. In fact, a too worn tyre becomes very dangerous because it can give rise to a reduction in the vehicle's roadholding, an increase in the braking distances, etc.

The European patent application EP 1759891 discloses a wear detecting system in a tyre involving use of a detecting unit adapted to detect the acceleration to which a wear bar positioned in a groove of the tyre tread is submitted. When the tyre is not yet too worn, the bar does not come into contact with the ground and the acceleration detected by the detecting unit is contained within limits. As a result of the tyre wear, the bar comes into contact with the ground at each wheel revolution, causing an important increase in the acceleration detected by the detecting unit.

SUMMARY OF THE INVENTION

The Applicant has noticed that in the above described solution the system is not able to monitor the progressive increase in the wear state of the tyre, but only provides the signalling concerning achievement of the full wear condition of the tyre itself.

In other words, the above described system is unable to determine "intermediate" wear levels of the tyre, and therefore cannot monitor the progressive increase in the phenomenon.

Therefore, the only useful information offered by such a system concerns the requirement of replacing the tyre, since the latter has terminated its useful lifetime.

On the contrary, the Applicant has found that by means of sensors disposed inside the tyres themselves it is possible to carry out monitoring of the progressive wear degree in the tyres of a vehicle and therefore it is possible to obtain additional information that can be particularly useful for identifying in advance possible uneven-wear phenomena in said tyres.

In greater detail, the Applicant has found that by comparing with each other the wear levels of at least two tyres fitted on a vehicle, which levels are determined by sensors, it is possible to determine whether the wear of these tyres takes place in a correct and balanced manner or not, so as to enable a maintenance intervention to be taken, for instance by adjusting the wheel alignment, if a problem of uneven wear is identified in the tyres fitted on the vehicle.

With reference to the above mentioned European patent application EP 1759891, the Applicant has further noticed that, in order to enable the therein described system to operate in a correct manner, it is at least necessary for the acceleration detecting unit to be positioned at the wear bars. The accuracy required for this positioning is a significant disadvantage.

On the contrary, the Applicant has found that an accurate and reliable monitoring of the wear conditions of a tyre can be accomplished by a sensor fitted inside the tyre itself, without such a sensor requiring to be positioned at predetermined locations along the tyre circumference.

In particular, the Applicant has found that a signal representative of a deformation of an inner surface of the tyre, and more specifically of an acceleration due to deformation of said inner surface, can be suitably processed and correlated with the tyre wear.

In greater detail, the Applicant has ascertained that the tyre wear can be determined as a function of a signal of acceleration due to deformation in the inner surface of the tyre, which signal is detected at least in a "pre-footprint" region.

Note that, in the present context and the following claims by "footprint area" it is intended the contact region between the tyre and the rolling surface.

By "pre-footprint region", on the contrary, it is intended a region contiguous to the footprint area and preceding the latter in a rotation direction of the tyre.

By "post-footprint region" it is intended a region contiguous to the footprint area and following the latter in a rotation direction of the tyre.

In addition, in the present specification and the following claims, by "central angle" it is intended an angle having its vertex at the centre of the hub of the wheel to which said tyre belongs, which is measured on a section perpendicular to the hub axis.

According to a first aspect, the present invention relates to a method of controlling the wear in vehicle tyres, comprising the following steps:

detecting a deformation of an inner surface of a first tyre fitted on a vehicle, by means of a first sensor fitted inside said first tyre;
   determining a first level of wear of the first tyre depending on the detection carried out by said first sensor;
   detecting a deformation of an inner surface of a second tyre fitted on said vehicle, by means of a second sensor fitted inside said second tyre;
   determining a second level of wear of the second tyre depending on the detection carried out by said second sensor;
   comparing said first and second levels of wear with each other;
   generating a notification signal representative of said comparison.

In another aspect, the present invention relates to a system for controlling the wear in vehicle tyres, comprising:
   at least one first sensor adapted to be fitted inside a first tyre of said vehicle, and to detect a deformation of an inner surface of said first tyre;
   at least one second sensor adapted to be fitted inside a second tyre of said vehicle, and to detect a deformation of an inner surface of said second tyre;
   at least one control unit provided with:
   at least one processing module operatively associated with said first and second sensors, said at least one processing module being adapted to determine a first wear level of said first tyre as a function of the detection of said first sensor, and a second wear level of said second tyre as a function of the detection of said second sensor;

a comparison module adapted to compare said first and second wear levels with each other;

a signalling module adapted to generate notification signal representative of said comparison.

Preferably, the notification signal is representative of the fact that the two wear levels differ by a greater value than a predetermined threshold, so as to inform a control system of the vehicle that an anomaly or malfunction causing an uneven wear of the two tyres is likely to occur.

Preferably, determination of said wear levels is carried out as a function of a deformation of the inner surface of the respective tyres, at an outer detection region substantially contiguous to the footprint area defined between each tyre and the rolling surface on which the latter is running.

In a further aspect, the present invention relates a method of determining the wear of a tyre, wherein said tyre rolls on a rolling surface, a footprint area being defined between the tyre and said rolling surface, said method comprising the following steps:

identifying a detection region which is external and substantially contiguous to the footprint area;

detecting a first signal representative of a deformation of an inner surface of the tyre, said first signal comprising at least one first portion representative of said deformation in the detection region;

processing at least said first portion of said first signal so as to determine at least one parameter representative of the wear of said tyre.

In a still further aspect the invention relates to a system for determining the wear of a tyre, comprising:

a tyre adapted to roll on a rolling surface so as to define a footprint area between the tyre and said rolling surface, and a detection region that is external and substantially contiguous to the footprint area;

at least one sensor fitted on an inner surface of said tyre, for detecting at least one first signal representative of a deformation of said inner surface of the tyre, said first signal comprising at least one first portion representative of said deformation in the detection region;

at least one processing unit operatively associated with said sensor for receiving said first signal and adapted to process at least said first portion of said first signal so as to determine at least one parameter representative of the wear of said tyre.

Preferably, the detection region comprises a pre-footprint region substantially contiguous to the footprint area and preceding the latter in the rotation direction of the tyre.

Preferably, the longitudinal ends of the pre-footprint region define a central angle of a width included between 25° and 65°, and in particular between 40° and 50°.

The Applicant has ascertained that in pre-footprint regions thus defined it is possible to obtain particularly accurate information about the wear of the tyre.

Preferably, the first signal is filtered in a frequency band included between 700 Hz and 2000 Hz, and in particular between 1000 Hz and 1700 Hz.

The Applicant has ascertained that, within these frequency ranges, the first signal can be correlated with the tyre wear in a particularly accurate and reliable manner.

Preferably, the detection region also comprises a post-footprint region that is substantially contiguous to the footprint area and follows the latter in the rotation direction of the tyre.

Preferably, the longitudinal ends of the post-footprint area define a central angle of a width included between 25° and 65° and in particular between 40° and 50.

Preferably the tyre wear is determined through a comparison, and in particular a difference, between a first parameter obtained from the processing of said first signal in said pre-footprint region, and a second parameter obtained from the processing of said first signal in said post-footprint region.

Further features and advantages will become more apparent from the detailed description of a preferred but not exclusive embodiment of a system and a method of determining the wear of a tyre in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

With reference to the drawings, a tyre for vehicle wheels has been generally identified with reference numeral 1.

Tyre 1 (FIG. 1) is fitted on a rim 2, in turn fitted on a hub 3; through hub 3, tyre 1 is associated with a vehicle (not shown) to enable movement thereof.

Figure 1:
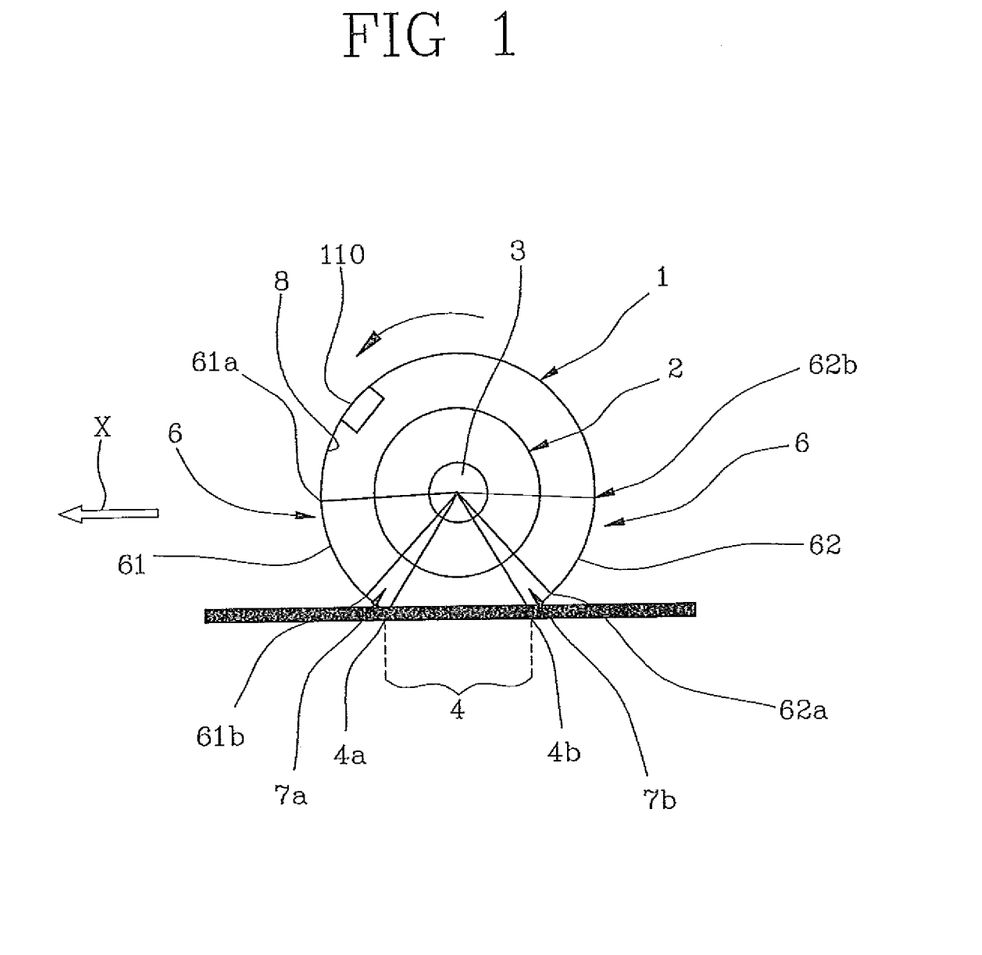
FIG. 1 diagrammatically shows a vehicle tyre used within the scope of the present invention.

While the vehicle is running, tyre 1 rolling on the rolling surface 5 (the ground, for example) is submitted to a displacement in a longitudinal direction X that is substantially parallel to the rolling surface 5 itself.

As mentioned above, tyre 1 is in contact with the rolling surface 5 in the so-called "footprint area" 4; the latter is defined between a first and a second longitudinal end, 4a and 4b respectively.

The method of the invention first of all comprises a step of detecting an outer detection region 6 on tyre 1, which region is substantially contiguous to the footprint area 4.

Preferably, the detection region comprises a pre-footprint region 61 and a post-footprint region 62.

The pre-footprint region 61 is substantially contiguous to the footprint area 4 and precedes the latter in the rotation direction of tyre 1. Preferably, the pre-footprint region 61 has a first longitudinal end 61a and a second longitudinal end 61b, said first and second longitudinal ends 61a, 61b defining a central angle of a width included between 25° and 65°. In greater detail, the first and second longitudinal ends 61a, 61b of the pre-footprint region 61 define a central angle of a width included between 40° and 50°.

The post-footprint region 62 is substantially contiguous to the footprint area 4 and follows the latter in the rotation direction of tyre 1. Preferably, the post-footprint region 62 has a first longitudinal end 62a and a second longitudinal end 62b, said first and second longitudinal ends 62a, 62b defining a central angle of a width included between 25° and 65°. More particularly, the first and second longitudinal ends 62a, 62b of the post-footprint region 62 define a central angle of a width included between 40° and 50°.

Advantageously, a first intermediate region 7a is provided between the first longitudinal end 4a of the footprint area 4 and the second longitudinal end 61b of the pre-footprint region 61.

The longitudinal ends of the first intermediate region 7a define a central angle of a width included between 3° and 10° and equal to about 5°, for example.

Preferably, the detection region 6 does not include the first intermediate region 7a.

Advantageously, a second intermediate region 7b is provided between the first longitudinal end 62a of the post-footprint region 62 and the second longitudinal end 4b of the footprint area 4.

The longitudinal ends of the second intermediate region 7b define a central angle of a width included between 3° and 10° and equal to about 5°, for example.

Preferably, the detection region does not include the second intermediate region 7b.

For identifying the footprint area 4 and the pre-footprint and post-footprint regions 6a and 62, it is possible to proceed as hereinafter described by way of example.

A radial accelerometric signal is detected which corresponds to the radial deformation of the inner surface of tyre 1. This signal is typically sampled to a frequency included between 4000 Hz and 20000 Hz, a frequency of 10000 Hz, for example.

Then filtering of the low-pass type, below the thirtieth harmonic for example, is carried out so as to mainly emphasise the so-called macrodeformation, i.e. the tyre portion feeling the effects of the deformation due to deflection of same around the footprint area.

The two absolute minima on a revolution of the radial accelerometric signal identify the longitudinal ends 4a, 4b of the footprint area 4.

Then, after determining the inverse of the angular resolution given by the sampling of the signal:

$$Ir = \frac{points\_per\_revolution}{360}$$

and taking the already defined footprint area 4 as a reference, it is possible to identify the pre-footprint regions 61 and post-footprint regions 62 as the regions defining a predetermined central angle and spaced apart a predetermined angle (corresponding to the intermediate regions 7a-7b) from the ends of the footprint area 4.

Figure 5:
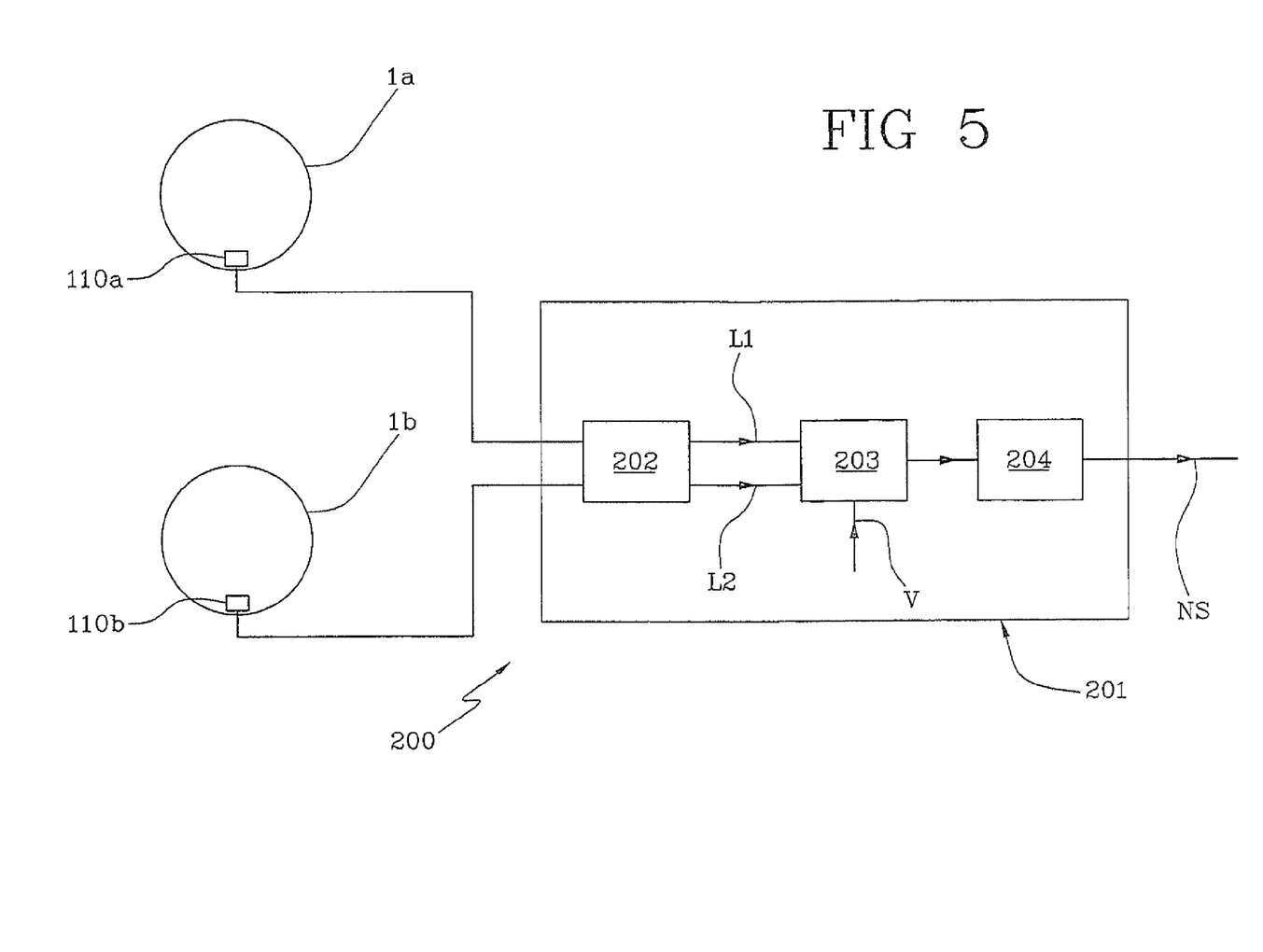
FIG. 5 is a block diagram of a system for wear control in vehicle tyres in accordance with the invention.

The method, according to an aspect of the invention, comprises a step of determining a first wear level L1 of a first tyre 1a, fitted on a vehicle, as a function of a detection carried out by a first sensor 110a fitted inside such a first tyre 1a.

As specified in greater detail in the following, the sensor can be a sensor of the accelerometric type, preferably fitted inside the first tyre 1a for detecting data representative of the deformation of the inner surface of said first tyre.

The method, according to an aspect of the invention, further comprises a step of determining a second wear level L2 of at least one second tyre 1b, fitted on said vehicle, as a function of a detection of a respective second sensor 110b fitted inside the second tyre 1b itself.

In the same manner as stated in connection with the first tyre 1a and the respective first sensor 110a, the second sensor 110b can be a sensor of the accelerometric type, preferably fitted inside the second tyre 1b for detecting data representative of the deformation of the inner surface of the second tyre 1b itself.

Preferably, the first and second sensors 110a, 110b detect data representative of deformations of the inner surfaces of the respective tyres 1a, 1b at external detection regions substantially adjacent to the respective footprint areas.

As mentioned above, the detection regions can comprise the respective pre-footprint regions and/or the respective post-footprint regions.

Details concerning the determining of the wear level of a tyre as a function of these detection operations will be supplied in the following.

Note that the first and second wear levels L1, L2 are representative of how much the first and second tyres 1a, 1b respectively are worn out, i.e. how much the respective outer surfaces are worn out. This wear level L1 and/or L2 can advantageously be represented by a number in percentage included between 0 (a new tyre) and 100 (a tyre that is completely worn out).

For each one of tyres 1a, 1b a footprint area, a pre-footprint region, a post-footprint region, and a first and second intermediate regions can be advantageously identified, as described above in connection with a generic tyre 1, with reference to FIG. 1.

The method, according to an aspect of the invention, further comprises a step of comparing the first and second wear levels L1, L2 with each other, for determining whether unevennesses due to wear exist between the two tyres 1a, 1b.

Then a notification signal NS is generated which is representative of this comparison, so as to provide a control system of the vehicle for example, with the information about the different wear levels.

More particularly, a difference between the first and second wear levels L1, L2 can be determined, and this difference can be compared with a prestored threshold value V. The notification signal NS can be generated as a function of this comparison.

Therefore, if the difference between the two levels L1, L2 is greater than the threshold value V, i.e. if the two tyres 1a, 1b are worn out in a significantly different manner, the notification signal NS allows this information to be given to the control system of the vehicle and/or the vehicle's driver.

Note that, while specific reference has been made to determining the difference between the two wear levels L1, L2, a ratio between the two values can be also used, as well as any other parameter representative of a measurement of the difference between the two wear levels L1, L2.

Advantageously, the first and second tyres 1a, 1b substantially show the same geometric rotation axis during rolling on the rolling surface. In other words, the first and second tyres 1a, 1b can for example be, when a car is concerned, the two front tyres or the two rear tyres of the vehicle.

It should be pointed out that, while application of the method of the invention to only two tyres has been hitherto discussed, this method can advantageously be applied to all the vehicle tyres, so that a full control on the wear evenness of said tyres is achieved.

FIG. 5 shows a block diagram of a system 200 that can be used for putting the above mentioned method into practice.

System 200 comprises the first and second tyres 1a, 1b. System 200 also comprises said first and second sensors 110a, 110b, fitted inside the first and second tyres 1a, 1b, respectively.

System 200 further comprises a control unit 201 operatively associated with the first and second sensors 110a, 110b; the control unit 201 is provided with:

at least one processing module 202 for determining the first and second wear levels L1, L2 as a function of the detection operations of the first and second sensors 110a, 110b;

a comparison module 203 for comparing said first and second wear levels L1, L2 with each other;

a signalling module 204 for generating the aforesaid notification signal NS.

The comparison module 203 is preferably provided for carrying out a difference between the two wear levels L1, L2 and for comparing the result of this difference with said threshold value V.

The signalling module 204 can then generate the notification signal NS as a function of the last-mentioned comparison, and in particular, when the value of the difference between levels L1, L2 exceeds value V.

It is to be understood that the processing aiming at detecting the wear levels L1 and L2 of the two tyres 1a and 1b can be carried out by a respective processing unit 202 associated with each tyre.

Hereinafter described is a method and a system for determining the wear of a tyre, which method and system can be advantageously used in the above discussed method and system for wear control.

Figure 4:
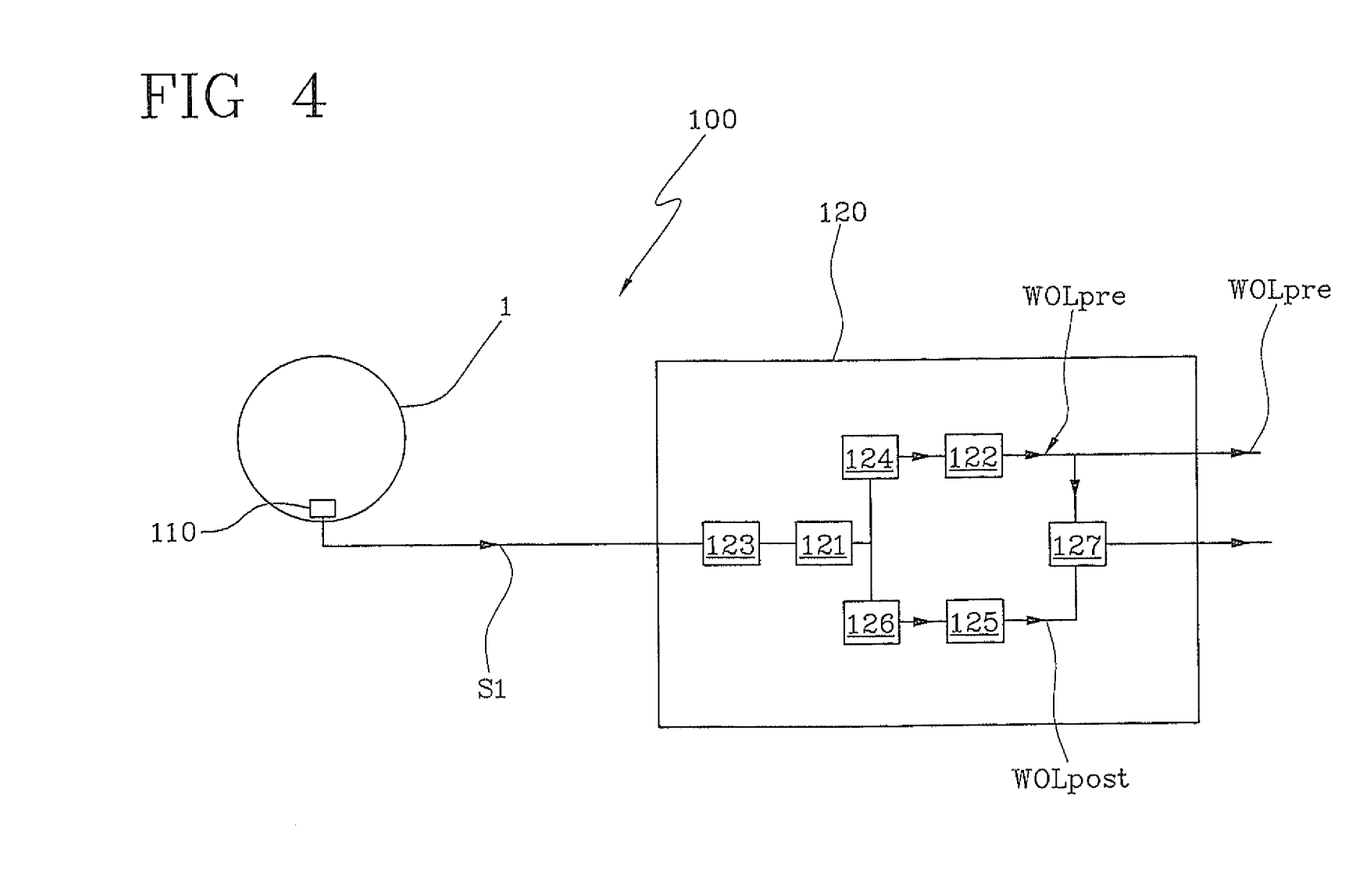
FIG. 4 is a block diagram of a system for determining the wear of a tyre in accordance with the present invention.

In particular, the above described processing module 202 can have the features of the processing unit 120 to be described hereinafter; the wear levels L1, L2 determined by the processing module 202 correspond to the parameters supplied as an output by such a processing unit 120.

Tyre 1 to which reference will be made in the following will be able to be representative of both the first tyre 1a, and the second tyre 1b, depending on whether the first wear level L1 or the second wear level L2 is wished to be determined.

Likewise, sensor 110 that will be described below will be able to be representative, depending on the circumstances, of either said first sensor 110a or said second sensor 110b.

As mentioned above, the present invention also concerns a method of determining the wear of a tyre.

This method comprises a step of detecting a first signal S1 representative of a deformation of an inner surface 8 of tyre 1.

In particular, the first signal S1 comprises at least one first portion representative of a deformation of the inner surface 8 of tyre 1 in the detection region 6.

The inner surface 8 of tyre 1 can for instance consist of a liner of said tyre 1.

Generally, the first signal S1 can be representative of the amount of the deformation of the inner surface 8 of tyre 1, of the variation speed of this deformation, or of the acceleration corresponding to the deformation itself; at all events, the first signal S1 can be considered as representative of the deformation of the inner surface 8 of tyre 1.

Preferably, the first signal S1 is representative of an acceleration corresponding to the deformation of the inner surface 8 of tyre 1.

In greater detail, the first signal S1 is representative of an acceleration corresponding to the radial, and/or tangential and/or lateral deformation of the inner surface 8 of tyre 1.

Preferably, the first signal S1 is filtered in a first frequency band B1. Preferably, this first frequency band B1 is included between 700 Hz and 2000 Hz. More particularly, the first frequency band B1 is included between 1000 Hz and 1700 Hz.

Figure 2A:
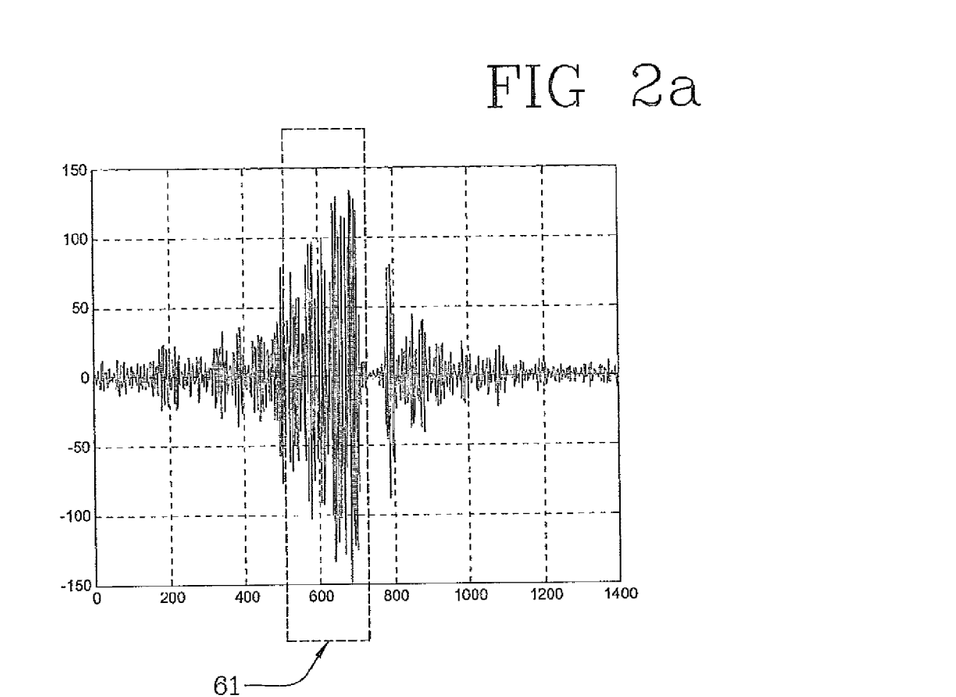
FIGS. 2a and 2b shows a graph representative of a radial acceleration relating to a worn tyre, and a graph representative of a radial acceleration relating to an unworn tyre, respectively.
Figure 2B:
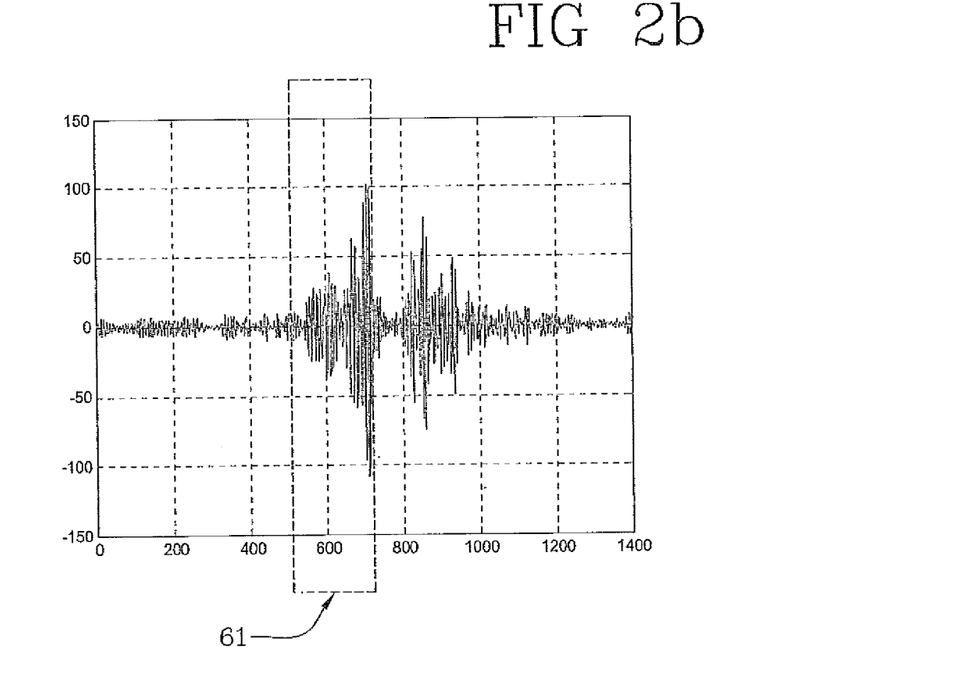

FIGS. 2a and 2b diagrammatically show the variation in time of the radial acceleration detected on the inner surface of a worn-out tyre, and on the inner surface of an unworn tyre.

Represented on the x-axis is a time measurement unit substantially covering a full revolution of the tyre; represented on the y-axis is the intensity of the radial acceleration detected in the two case. Both accelerations have been filtered in the range of between 1000 Hz and 1700 Hz.

As can be noticed, on the inner surface of the worn-out tyre (FIG. 2a), a more intense radial acceleration occurs at the pre-footprint region 61, as compared with an unworn tyre (FIG. 2b).

The method, according to an aspect of the invention, further comprises a step of processing the first signal S1 so as to determine at least one parameter representative of the wear of tyre 1.

In greater detail, the method of the invention contemplates a step of calculating at least one first parameter, as a function of a mean value calculated using the amplitude of the first signal S1 in the detection region 6. In particular, the first parameter is calculated as a function of a mean value of the amplitudes of the first signal S1 in the pre-footprint region 61.

Then, depending on at least the first parameter, the wear of tyre 1 is determined.

Note that in the present context and in the following claims, by "mean value" it is intended any type of average of the function or of the considered assembly of samples; this average can be, for example, an arithmetic average, a geometric average, a root mean square value, an average calculated on the absolute value or absolute values of the considered magnitudes, etc.

Preferably, the first signal S1 is sampled; in particular, the sampling can take place at a frequency included between 4000 Hz and 20000 Hz, and equal to 10000 Hz, for example.

The first parameter representative of the wear can therefore be calculated as a function of the mean value of the amplitudes of the samples obtained through said sampling step.

Preferably, the first parameter is a function of a root mean square value of the amplitude of said samples.

Alternatively, the first parameter can be a function of an arithmetic average of the absolute values of the amplitudes of said samples.

By way of example, a first parameter $WOL_{PRE}$ representative of the wear can be calculated as follows:

$$WOL_{PRE} = \sqrt{\frac{\sum_{i=1}^{M} acc_{PRE}(i)_{B1}^2}{M}}$$

wherein:

$acc_{PRE}(i)_{B1}$ is the amplitude of the i-th sample obtained from the sampling of said first signal S1, filtered in the first frequency band B1 and being part of the signal portion S1 corresponding to a pre-footprint region 61;

M is the number of samples being part of the signal S1 portion corresponding to the pre-footprint region 61.

Figure 3:
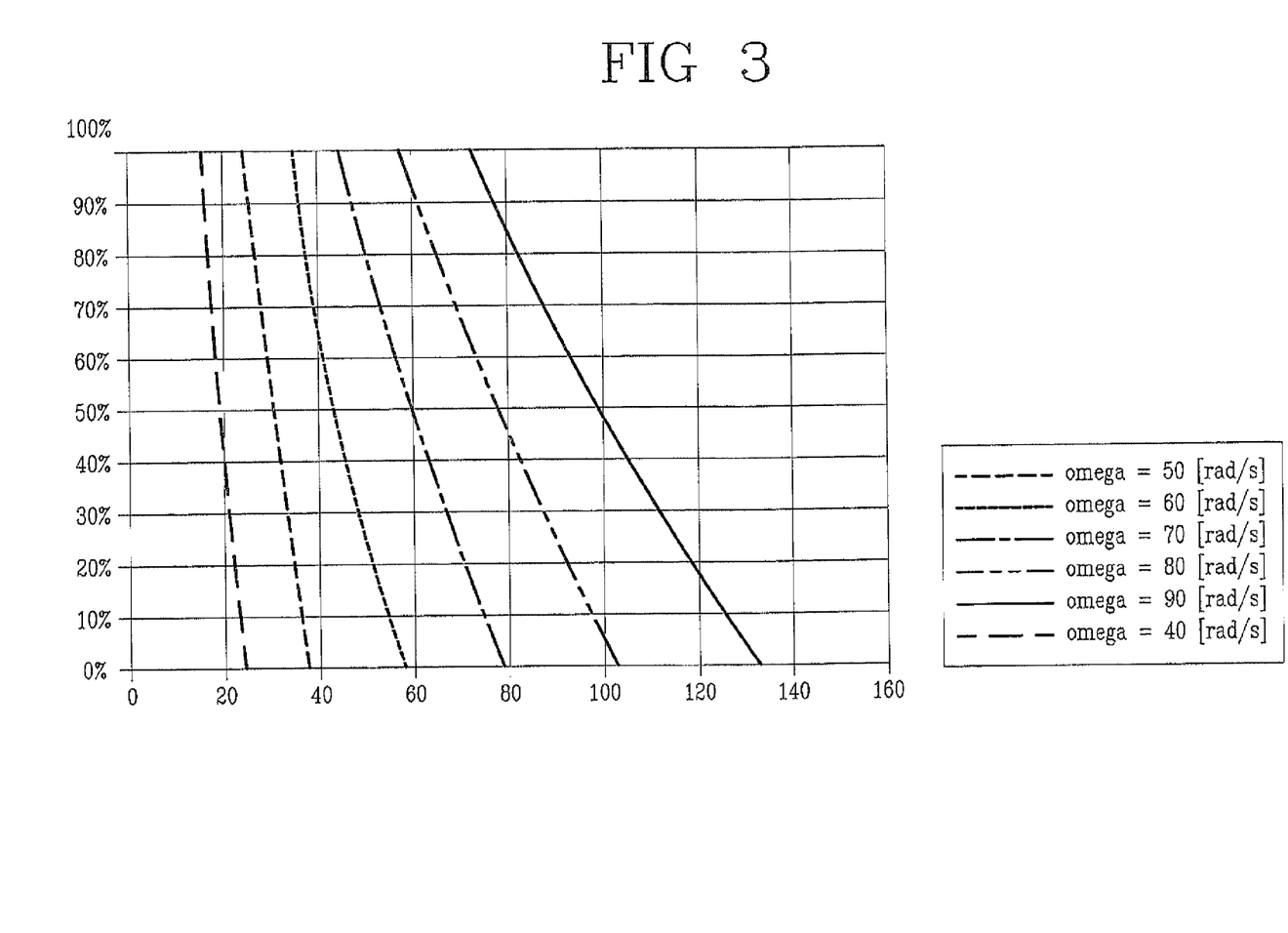
FIG. 3 shows a graph representative of the correlation between the tyre wear and a parameter calculated by putting the invention into practice.

FIG. 3 shows the correlation between the first parameter $WOL_{PRE}$ (x-axis) calculated according to the above reproduced formula and the tyre wear (expressed in percentage on the y-axis).

As it is possible to notice, there are several curves, each relating to a different speed.

Therefore, the rolling speed of the tyre being determined (which is always detectable by the accelerometric signal, for example), it is possible to use the most appropriate curve for establishing the wear level of tyre 1 starting from the calculated $WOL_{PRE}$ value.

For determining the angular speed of tyre 1, different techniques can be utilised which make use of the radial acceleration value out of the footprint area 4, or start from the longitudinal length of the footprint area (practically the distance between the longitudinal ends 4a, 4b of the footprint area 4 defined along the outer surface of tyre 1 in the equatorial plane thereof), detectable by the radial accelerometric signal.

A further opportunity for determining the angular speed of tyre 1 is provided by the equipment on board the vehicle that is able to calculate the vehicle speed and therefrom obtain the angular speed of tyre 1.

It is to be pointed out however that wear is not a phenomenon evolving in a particularly quick manner. Therefore, determination of the wear conditions of tyre 1 cannot be performed continuously, but only under selected conditions: for instance, favourable weather conditions, substantially constant speed, speed equal to a predetermined value or within a pre-established value range, medium-smooth rolling surface, etc.

Furthermore, for increasing the reliability of measurement and reducing the consequences of possible spurious effects caused by situations of quick transient (rolling on an obstacle, a sharp bend or sudden braking, etc.) detection operations and calculations for each revolution carried out by the tyre can be done, so as to calculate the averages of the parameter representative of the wear on the results obtained on several revolutions.

As mentioned above, the detection region 6 can also comprise a post-footprint region 62.

The method, according to an aspect of the invention, can therefore comprise a step of processing the signal S1 in a second portion thereof, representative of the inner deformation of tyre 1 in the post-footprint region 62.

In greater detail, the method according to the invention contemplates a step of also calculating a second parameter $WOL_{POST}$, as a function of a mean value of the amplitudes of the first signal S1 in the post-footprint region 62.

The tyre wear can be therefore determined based on the first parameter $WOL_{PRE}$ and the second parameter $WOL_{POST}$.

The second parameter $WOL_{POST}$ can be calculated as a function of the mean value of the amplitudes of the samples obtained through said sampling step in the post-footprint region 62.

Preferably, the second parameter $WOL_{POST}$ is a function of a root mean square value of the amplitude of said samples.

Alternatively, the second parameter $WOL_{POST}$ can be a function of an arithmetic average of the absolute values of the amplitudes of said samples.

By way of example, the second parameter $WOL_{POST}$ can be calculated as follows:

$$WOL_{POST} = \sqrt{\frac{\sum_{i=1}^{M} acc_{POST}(i)_{B1}^2}{M}}$$

wherein:
$acc_{POST}(i)_{B1}$ is the amplitude of the i-th sample obtained from the sampling of the first signal S1, filtered in said first frequency band B1 and being part of the signal S1 portion corresponding to the post-footprint region;
M is the number of said samples being part of the signal S1 portion corresponding to the post-footprint region 62.

Preferably, the wear of tyre 1 is determined as a function of a comparison and in particular a difference, between the first and second parameters $WOL_{PRE}$, $WOL_{POST}$.

Due to this difference, a particularly accurate identification of the wear conditions of tyre 1 is obtained.

FIG. 4 is a block diagram of a system 100 in accordance with an aspect of the present invention.

In addition to the aforesaid tyre 1, system 100 comprises at least one sensor 110, fitted on the inner surface 8 of tyre 1, for detecting at least the first signal S1. Preferably, sensor 110 is disposed substantially at the equatorial plane of the tyre. Preferably, sensor 110 comprises at least one radial accelerometer.

System 100 further comprises a processing unit 120 operatively associated with sensor 110 for receiving the first signal S1 and designed to determine the wear of tyre 1 as a function of a processing of the first signal S1.

Preferably, the processing unit 120 comprises a sampling module 123 for sampling the first signal S1. In particular, the sampling carried out by module 123 can occur at a frequency included between 4000 Hz and 20000 Hz, and equal to 10000 Hz, for example.

Advantageously, the processing unit 120 comprises a filtering module 121 for filtering the first signal S1 in the first frequency band B1 that, as pointed out above, can be included between 700 Hz and 2000 Hz, and in particular between 1000 Hz and 1700 Hz.

The processing unit 120 preferably comprises a first selection module 124, for selecting, within the first signal S1, the portion corresponding to said pre-footprint region 61.

Preferably, the processing unit 120 comprises a first computing module 122, connected downstream of said first selection module 124 for determining said first parameter $WOL_{PRE}$ as a function of a mean value of the amplitude of the first signal S1.

As specified above, the first parameter $WOL_{PRE}$ is a function of a mean value of the amplitude of the obtained samples being part of the signal portion S1 corresponding to the pre-footprint region 61, i.e. the samples selected by the first selection module 124.

As pointed out above, the first parameter $WOL_{PRE}$ can be calculated as a root mean square value of the amplitude in the portion of the first signal S1 in the pre-footprint region, i.e. according to the formula:

$$WOL_{PRE} = \sqrt{\frac{\sum_{i=1}^{M} acc_{PRE}(i)_{B1}^2}{M}}$$

wherein:
$acc_{PRE}(i)_{B1}$ is the amplitude of the i-th sample obtained from the sampling of said first signal, filtered in the first frequency band B1 and being part of the signal S1 portion corresponding to a pre-footprint region;
M is the number of the samples being part of the signal portion S1 corresponding to the pre-footprint region.

Preferably, the processing unit 120 comprises a second selection module 126 for selecting, within the signal S1, the portion corresponding to said post-footprint region 62.

Preferably, the processing unit 120 further comprises a second computing module 125, connected downstream of said second selection module 126, for determining the second parameter $WOL_{POST}$ as a function of a mean value of the amplitude of the samples belonging to the portion of the first signal S1 corresponding to the post-footprint region.

As specified above, the second parameter $WOL_{POST}$ can be calculated as a root mean square value of the amplitude in the portion of the first signal S1 corresponding to the post-footprint region, i.e.:

$$WOL_{POST} = \sqrt{\frac{\sum_{i=1}^{M} acc_{POST}(i)_{B1}^2}{M}}$$

wherein:

$acc_{POST}(i)_{B1}$ is the amplitude of the i-th sample obtained from the sampling of said first signal S1, filtered in the first frequency band B1 and being part of the signal portion corresponding to the post-footprint region;

M is the number of the samples being part of the signal portion S1 corresponding to the post-footprint region.

As pointed out above, the wear of tyre 1 can be conveniently determined as a function of a comparison, and in particular a difference between the first and second parameters $WOL_{PRE}$ and $WOL_{POST}$.

The last-mentioned operation can be performed by a suitable subtraction module 127.

Once the wear of tyre 1 has been determined, the system can utilise this information in different ways.

For instance, by performing further processing operations, also as a function of the distance run by the vehicle in a given period of time, it is possible to evaluate whether there is too much wear or the wear is distributed in a too uneven manner over time, thus identifying possible problems for example relating to the mechanical structure of the vehicle or to the tyre itself.

An application example consists in the above described method and system for wear control.

A further possible application relates to determination of an aquaplaning condition of the vehicle, since this condition depends on the wear level of the tyres fitted on the vehicle.

Note that for determination of the values shown in FIG. 3 it is possible to proceed in the following manner.

A first set of substantially new, i.e. unworn, tyres is used and the above described parameters are determined, by making the vehicle travel and detecting the magnitudes necessary for mathematical/experimental calculation of the wear level of the tyre.

Then a second set of about 50%-worn tyres is used, i.e. tyres that are in the middle of their useful life, and the detection and calculation operations are repeated.

Subsequently a set of fully worn-out tyres is utilised and the detection and calculation operations are carried out for the third time.

The values of the parameters in the three situations (new tyre, 50% worn tyre and fully worn-out tyre) being thus obtained, it is possible to proceed to interpolating said values through a suitable mathematical model so as to obtain a graph like the one shown in FIG. 3.

A quite similar computation can be carried out for parameter $WOL_{POST}$.

It is to be noted that in the preferred embodiment, the processing unit 120 is positioned out of tyre 1, and in particular on board the vehicle on which tyre 1 is fitted. Communication between sensor 110 and processing unit 120 typically takes place by a wireless transmission.

Practically, the processing unit 120 can be included or operatively associated with the electronic onboard equipment made available for the driver. In alternative configurations, the processing unit 120 can be positioned inside the tyre, or a first part of the processing operation can be performed in a unit placed inside the tyre and a second part of the processing operation can be performed in a unit placed on board the vehicle.

It is also to be pointed out that in the present context and the following claims, the processing unit 120 has been shown as divided into distinct functional modules for the only purpose of describing the functional features of the processing unit 120 itself in a clear and complete manner.

Actually, the processing unit 120 can consist of a single electronic device, suitably programmed for performing the above described functions and the different modules can correspond to hardware and/or routine software entities being part of the programmed device.

The same remarks are also valid for the control unit 201 described in FIG. 5.

The invention claimed is:

1. A method of determining wear of a tyre using a processing unit, wherein said tyre rolls on a rolling surface, a footprint area being defined between the tyre and said rolling surface, the method comprising:
   detecting a first signal representative of a deformation of an inner surface of the tyre;
   identifying at least one first portion comprised within said first signal using the processing unit, said first portion being representative of said deformation in a detection region which is external to the footprint area and substantially contiguous to the footprint area in the rotation direction of the tyre; and
   processing at least said first portion of said first signal using the processing unit so as to determine at least one parameter representative of the wear of said tyre, wherein said comprises filtering said first signal in a first frequency band in the range of between 700 Hz and 2000 Hz.

2. The method as claimed in claim 1, wherein said detection region comprises a pre-footprint region that is substantially contiguous to the footprint area and precedes the footprint area in a rotation direction of the tyre.

3. The method as claimed in claim 2, wherein said pre-footprint region has a first longitudinal end and a second longitudinal end, said first and second longitudinal ends defining a central angle of a width between 25° and 65°.

4. The method as claimed in claim 3, wherein the first and second longitudinal ends of said pre-footprint region define a central angle of a width of between 40° and 50°.

5. The method as claimed in claim 2, wherein the first portion of said first signal is representative of the deformation of the inner surface of the tyre in the pre-footprint region.

6. The method as claimed in claim 1, wherein the first portion of said first signal is representative of an acceleration corresponding to the deformation of said inner surface of the tyre in the detection region.

7. The method as claimed in claim 6, wherein the first portion of said first signal is representative of an acceleration corresponding to radial or tangential deformation of said inner surface of the tyre in the detection region.

8. The method as claimed in claim 1, further comprising sampling said first signal.

9. The method as claimed in claim 1, wherein said first frequency band is between 1000 Hz and 1700 Hz.

10. The method as claimed in claim 1, further comprising determining a first parameter ($WOL_{PRE}$) as a function of a mean value of amplitudes of said first signal in the first portion, the wear of said tyre being determined as a function of said first parameter ($WOL_{PRE}$).

11. The method as claimed in claim 10, wherein said first parameter ($WOL_{PRE}$) is a function of a root mean square value of the amplitude of said first signal in the first portion.

12. The method as claimed in claim 11, further comprising sampling said first signal, wherein said first parameter ($WOL_{PRE}$) is calculated according to the formula:

$$WOL_{PRE} = \sqrt{\frac{\sum_{i=1}^{M} acc_{PRE}(i)_{B1}^2}{M}}$$

wherein:

$acc_{PRE}(i)_{B1}$ is an amplitude of an i-th sample obtained from sampling of said first signal filtered in the first frequency band and being part of the signal portion corresponding to a pre-footprint region; and M is a number of said samples being part of the signal portion corresponding to the pre-footprint region.

13. The method as claimed in claim 12, wherein said detection region further comprises a post-footprint region that is substantially contiguous to the footprint area and subsequent thereto in a rotation direction of the tyre, further comprising:

selecting in said first signal a second portion representative of a deformation of an inner surface of the tyre in the post-footprint region; and determining the wear of said tyre from processing of said first and second portions of said first signal.

14. The method as claimed in claim 13, wherein said post-footprint region has a first longitudinal end and a second longitudinal end, said first and second longitudinal ends defining a central angle of a width between 25° and 65°.

15. The method as claimed in claim 14, wherein the first and second longitudinal ends of said post-footprint region define a central angle of a width between 40° and 50°.

16. The method as claimed in claim 13, wherein the second portion of said first signal is representative of an acceleration corresponding to the deformation of said inner surface of the tyre in the post-footprint region.

17. The method as claimed in claim 16, wherein the second portion of said first signal is representative of an acceleration corresponding to radial or tangential deformation of said inner surface of the tyre in the post-footprint region.

18. The method as claimed in claim 13, further comprising determining a second parameter ($WOL_{POST}$) as a function of a mean value of the amplitudes of said first signal in the second portion, the wear of said tyre being determined as a function of a comparison between said first and second parameters ($WOL_{PRE}$, $WOL_{POST}$).

19. The method as claimed in claim 18, wherein said second parameter ($WOL_{POST}$) is a function of a root mean square value of amplitudes in the second portion of said first signal.

20. The method as claimed in claim 19, wherein said second parameter ($WOL_{POST}$) is calculated according to the formula $$WOL_{POST} = \sqrt{\frac{\sum_{i=1}^{M} acc_{POST}(i)_{B1}^2}{M}}$$

wherein:

$acc_{POST}(i)_{B1}$ is the amplitude of an i-th sample obtained from sampling of the first signal filtered in said first frequency band and being part of the signal portion corresponding to the post-footprint region; and M is a number of said samples being part of the signal portion corresponding to the post-footprint region.

21. The method as claimed in claim 18, wherein the wear of said tyre is determined as a function of a difference between said first and second parameters ($WOL_{PRE}$, $WOL_{POST}$).

22. A system for determining a parameter representative of wear of a tyre, the system comprising:

a tyre adapted to roll on a rolling surface so as to define a footprint area between the tyre and said rolling surface, and a detection region that is external to the footprint area and substantially contiguous to the footprint area in the rotation direction of the tyre;

at least one sensor fitted on an inner surface of said tyre for detecting at least one first signal representative of a deformation of said inner surface of the tyre, said first signal comprising at least one first portion representative of said deformation in the detection region; and a processing unit operatively associated with said sensor for receiving said first signal and capable of being adapted to identify and process at least said first portion of said first signal so as to determine at least one parameter representative of the wear of said tyre, wherein said processing unit comprises a filtering module for filtering said first signal a first frequency band included between 700 Hz and 2000 Hz.

23. The system as claimed in claim 22, wherein said detection region comprises a pre-footprint region that is substantially contiguous to the footprint area and precedes the footprint area in a rotation direction of the tyre.

24. The system as claimed in claim 23, wherein said pre-footprint region has a first longitudinal end and a second longitudinal end, said first and second longitudinal ends defining a central angle of a width between 25° and 65°.

25. The system as claimed in claim 24, wherein the first and second longitudinal ends of said pre-footprint region define a central angle of a width between 40° and 50°.

26. The system as claimed in claim 22, wherein the first portion of said first signal is representative of an acceleration corresponding to the deformation of said inner surface of the tyre in the detection region.

27. The system as claimed in claim 26, wherein the first portion of said first signal is representative of an acceleration corresponding to radial or tangential deformation of said inner surface of the tyre in the detection region.

28. The system as claimed in claim 22, wherein the first portion of said first signal is representative of deformation of the inner surface of the tyre in the pre-footprint region.

29. The system as claimed in claim 22, wherein said processing unit further comprises a sampling module for sampling said first signal.

30. The system as claimed in claim 22, wherein said first frequency band is between 1000 Hz and 1700 Hz.

31. The system as claimed in claim 22, wherein said processing unit comprises a first computing module for determining a first parameter ($WOL_{PRE}$) as a function of a mean value of amplitudes of said first signal in the first portion.

32. The system as claimed in claim 31, wherein said first parameter ($WOL_{PRE}$) is a function of root mean square value of amplitudes of said first signal in the first portion.

33. The system as claimed in claim 32, further comprising a sampling module for sampling said first signal, wherein said first parameter ($WOL_{PRE}$) is calculated according to the formula:

$$WOL_{PRE} = \sqrt{\frac{\sum_{i=1}^{M} acc_{PRE}(i)_{B1}^2}{M}}$$

wherein:

$acc_{PRE}(i)_{B1}$ is an amplitude of an i-th sample obtained from sampling of said first signal, filtered in the first frequency band and being part of the signal portion corresponding to a pre-footprint region; and M is a the number of said samples being part of the signal portion corresponding to the pre-footprint region.

34. The system as claimed in claim 33, wherein said detection region comprises a post-footprint region that is substantially contiguous to the footprint area and subsequent to the footprint area in a rotation direction of the tyre, said processing unit further comprising a second selection module capable of being adapted to select a second portion in said first signal which second portion is representative of the deformation of the inner surface of the tyre in the post-footprint region and to determine wear of said tyre through processing of said first and second portions of said first signal.

35. The system as claimed in claim 34, wherein said post-footprint region has a first longitudinal end and a second longitudinal end and a second longitudinal end, said first and second longitudinal ends defining a central angle of a width between 25° and 65°.

36. The system as claimed in claim 35, wherein the first and second longitudinal ends of said post-footprint region define a central angle of a width between 40° and 50°.

37. The system as claimed in claim 34, wherein the second portion of said first signal is representative of an acceleration corresponding to the deformation of said inner surface of the tyre in the post-footprint region.

38. The system as claimed in claim 37, wherein the second portion of said first signal is representative of an acceleration corresponding to radial or tangential deformation of said inner surface of the tyre in the post-footprint region.

39. The system as claimed in claim 34, wherein said processing unit further comprises a second computing module capable of being adapted to determine a second parameter ($WOL_{POST}$) as a function of a mean value of amplitudes of said first signal in the second portion of said first signal.

40. The system as claimed in claim 39, wherein the wear said tyre is determined as a function of a difference between said first and second parameters ($WOL_{PRE}$, $WOL_{POST}$).

41. The system as claimed in claim 34, wherein said second parameter ($WOL_{POST}$) is a function of a root mean square value of amplitudes of said first signal in the second portion.

42. The system as claimed in claim 41, wherein said second parameter ($WOL_{POST}$) is calculated according to the formula:

$$WOL_{POST} = \sqrt{\frac{\sum_{i=1}^{M} acc_{POST}(i)_{B1}^2}{M}}$$

wherein:

$acc_{POST}(i)_{B1}$ is an amplitude of an i-th sample obtained from sampling of said first signal filtered in the frequency band and being part of the second signal portion corresponding to a post-footprint region; and M is a number of said samples being part of the signal portion corresponding to the post-footprint region.

43. The system as claimed in claim 22, wherein said processing unit is positioned on board a vehicle on which said tyre is fitted.

* * * * *

UNITED STATES PATENT AND TRADEMARK OFFICE
CERTIFICATE OF CORRECTION

PATENT NO.        : 8,775,017 B2                                           Page 1 of 1
APPLICATION NO.   : 13/125552
DATED             : July 8, 2014
INVENTOR(S)       : Massimo Brusarosco and Federico Mancosu It is certified that error appears in the above-identified patent and that said Letters Patent is hereby corrected as shown below:

In the Claims

Claim 22, col. 14, line 18, "said first signal a first frequency band" should read -- said first signal in a first frequency band --.

Claim 33 (con't), col. 15, line 3, "M is a the number" should read -- M is a number --.

Claim 35, col. 15, line 18, delete second instance of "and a second longitudinal end".

Claim 40, col. 16, lines 6-7, "wherein the wear said tyre" should read -- wherein the wear of said tyre --.

Signed and Sealed this
Seventeenth Day of February, 2015

Michelle K. Lee
*Deputy Director of the United States Patent and Trademark Office*